United States Patent

Orpana

[11] 3,993,367
[45] Nov. 23, 1976

[54] GUIDING ELEMENT FOR A VEHICLE TRACK

[75] Inventor: Robert J. Orpana, Ste. Foy, Canada

[73] Assignee: Panatrac Manufacturing Corporation Limited, Markham, Canada

[22] Filed: July 7, 1975

[21] Appl. No.: 594,141

[52] U.S. Cl. .................................. 305/36; 305/42; 305/57
[51] Int. Cl.² ........................................ B62D 55/20
[58] Field of Search ............. 305/42, 35 R, 36–38, 305/53, 56–59, 39; 74/229, 243 NC, 245 R, 245 P, 247, 250 S; 180/9.62

[56] References Cited
UNITED STATES PATENTS

| 2,731,304 | 1/1956 | Kubaugh | 305/57 X |
| 3,467,446 | 9/1969 | Seelbach, et al. | 305/57 |
| 3,477,768 | 11/1969 | Culver | 305/54 |
| 3,539,230 | 11/1970 | Comellas | 305/56 X |
| 3,578,823 | 5/1971 | Clymer | 305/42 |

Primary Examiner—Robert B. Reeves
Assistant Examiner—John P. Shannon
Attorney, Agent, or Firm—Rogers, Bereskin & Parr

[57] ABSTRACT

An endless track for a tracked vehicle is described. The track includes guiding elements pivotally coupled with other track elements. Each guiding element defines lateral guiding surfaces, a lower ground-engaging surface and lateral track driving projections.

7 Claims, 10 Drawing Figures

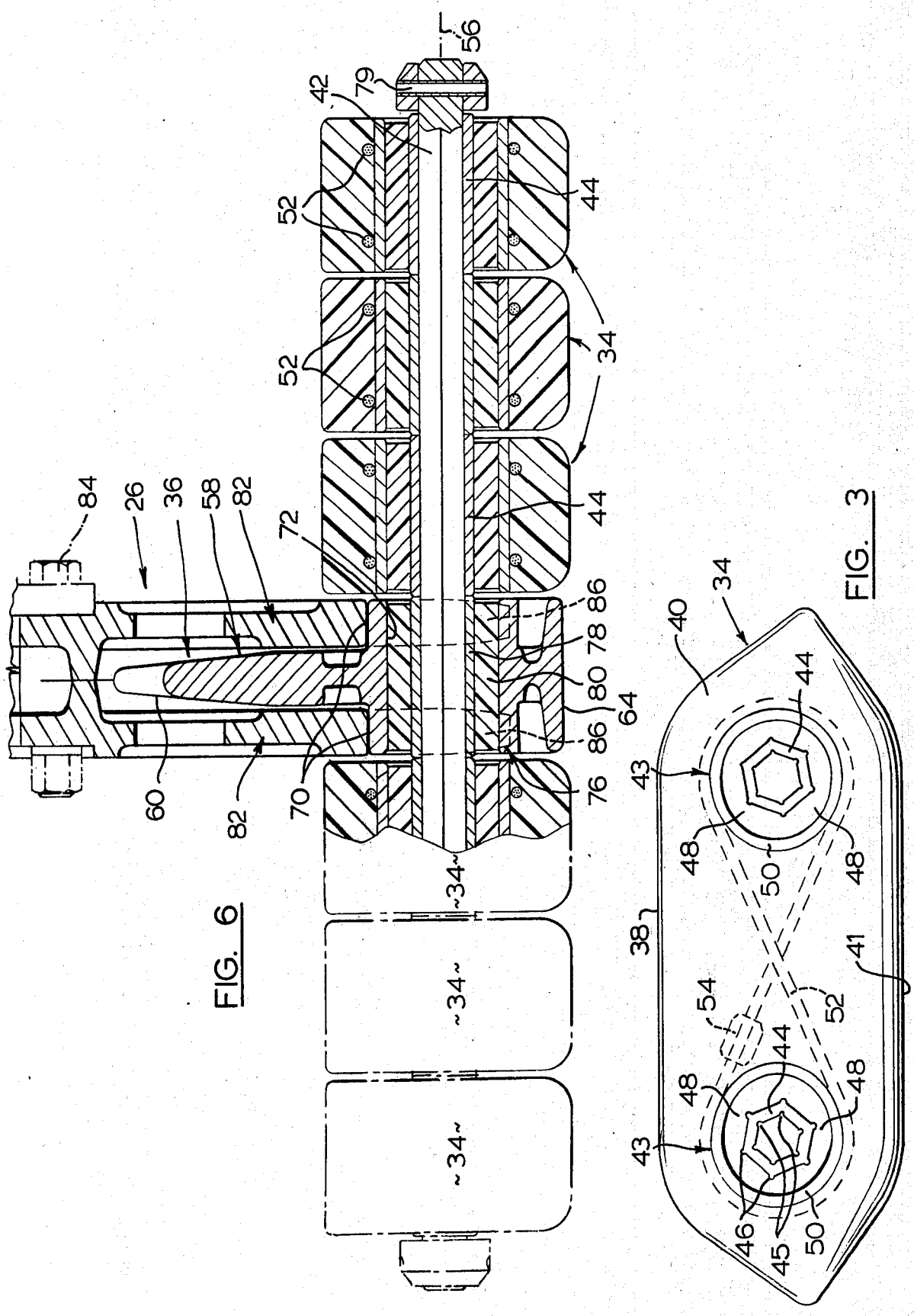

GUIDING ELEMENT FOR A VEHICLE TRACK

This invention relates generally to endless tracks for tracked vehicles. In particular, the invention is concerned with guiding elements for so-called "modular" tracks (also called "segmented" tracks) which are made up of a plurality of track elements pivotally coupled together. U.S. Pat. No. 3,649,085 discloses an example of a prior art track of this type.

An object of the present invention is to provide an improved guiding element for a vehicle track of the type referred to above.

According to the invention the element includes a body adapted to be coupled with other elements in a track about two transverse pivotal axes spaced longitudinally of the element. The body includes upwardly projecting guide means extending longitudinally of the body and defining laterally-disposed guiding surfaces for lateral location of a track incorporating the elements in use. The guide means have inwardly angled ends to allow clearance for relative angular movement between similar elements located adjacent one another longitudinally of a track in use. The body of the guiding element also defines a lower ground-engaging surface and cylindrical track driving formations projecting to both sides of the body. The formations are located at the positions of the said axes and are disposed concentrically with respect to said axes.

The invention will be better understood by reference to the accompanying drawings which illustrate one embodiment of the invention by way of example, and in which:

FIG. 3 is a side view of one of the traction elements of the track of FIG. 2;

FIG. 6 is a partial vertical sectional view through the track of FIG. 2 generally at the position of the track drive sprocket;

Figure 1:
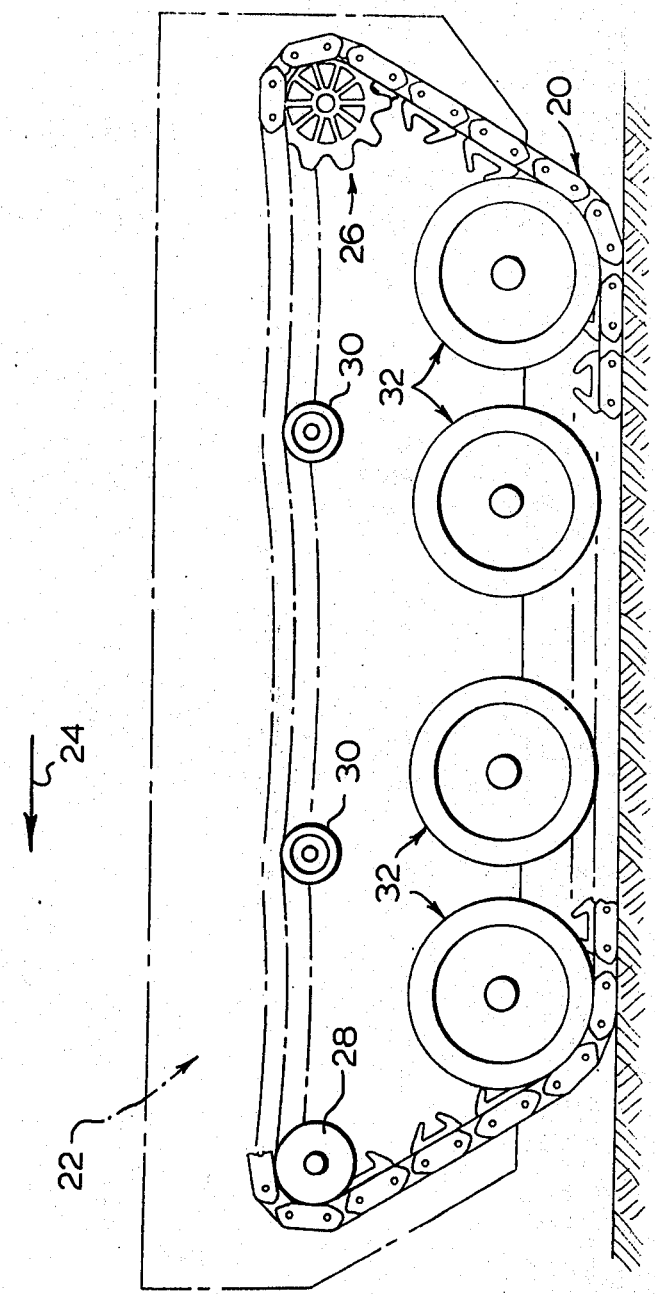
FIG. 1 is a diagrammatic illustration of a tracked vehicle fitted with an endless modular track incorporating guiding elements according to the invention.

Referring first to FIG. 1, the track is generally indicated at 20 and is fitted to a conventional tracked vehicle 22. The vehicle itself forms no part of the present invention and is therefore illustrated in ghost outline only. The direction of forward motion of the vehicle is indicated by arrow 24. The vehicle is fitted with a drive sprocket 26 which drivably engages the track 20 and which is located adjacent the rear end of the vehicle. Adjacent the front end of the vehicle, the track passes around an idler wheel 28. The upper run of the track between sprocket 26 and wheel 28 is supported by idlers 30. Four road wheels 32 run on the upper surface of the lower run of the track.

It will of course be appreciated that FIG. 1 shows one side of the vehicle only and that a second, similar track arrangement is provided at the opposite side of the vehicle.

Figure 2:
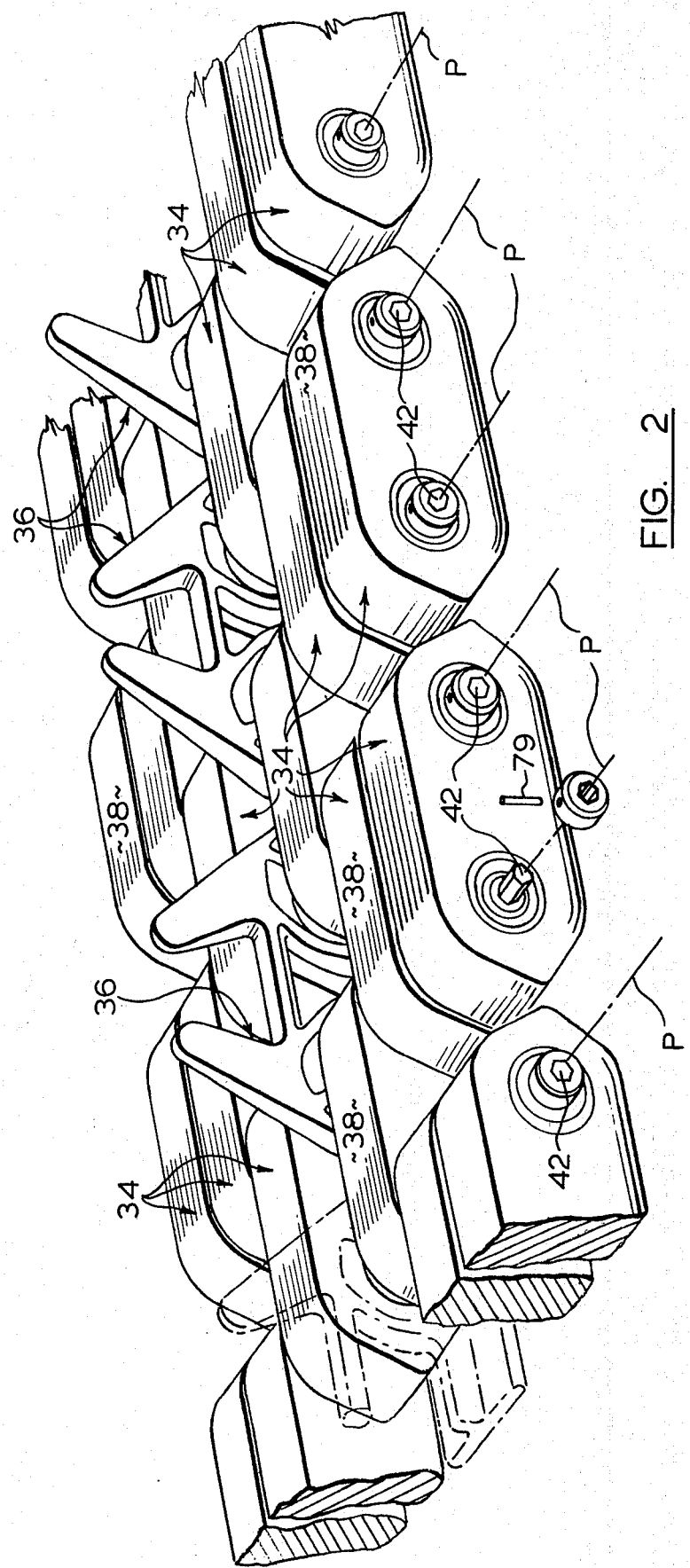
FIG. 2 is a perspective view of a section of the track shown in FIG. 1.

Referring now more particularly to FIG. 2, the track is made up of a plurality of track elements of two types: (a) traction elements and (b) guiding elements. The elements are modular in the sense that each element occupies a similar area of the track. The elements are coupled together by coupling means (to be described) which define pivot axes P extending transversely of the track. In FIG. 2 the traction elements are denoted 34 and the guiding elements are denoted 36. Both the traction elements and the guiding elements engage the ground when the track is in use. The traction elements present upper surfaces 38 on which the road wheels 32 of the vehicle run. The guiding elements serve to locate the track laterally in use as will be described. The guiding elements 36 also perform a track driving function in that they are engaged by the drive sprocket 26 of the vehicle for the purpose of driving the track as will be described.

As can be seen from FIG. 2 the track guiding elements 36 are arranged in a single row and the traction elements 34 are arranged in three rows on each side of and parallel to said row of guiding elements. The elements are also arranged symmetrically about the longitudinal median line of the track. As a result of this symmetrical arrangement, the road wheel contact area defined by the upper surfaces of the traction elements is symmetrical with respect to said median line. Accordingly, the track is loaded symmetrically in use by the road wheels 32 of the vehicle 22.

FIG. 3 shows one of the traction elements 34 of the track in side view. The element is in the form of an elastomeric module comprising a moulded body 40 of resilient elastomeric material. The body is moulded to the shape shown in FIG. 3 and has tapered ends as can be seen. The body 40 is adapted for contact with the ground in use and includes a lower ground contacting surface 41. In the assembled track, the track elements are coupled by shafts 42 which extend transversely of the track and which are coupled to the traction elements 34 and to the guiding elements 36. As can be seen, two such shafts 42 extend through each traction element. The shafts are positioned adjacent respectively opposite ends of the elements as can be seen from the drawings.

Each shaft 42 is of hexagonal shape in cross-section and is received in a coupling assembly 43 bonded into the traction element. Assembly 43 includes a hardened steel sleeve 44 of a shape generally complimentary to the shape of shaft 42. As can be seen, the inner surface of sleeve 44 is formed with longitudinal recesses 45 at the corners of the hexagon defined by the sleeve. These recesses make for easier fitting of the shaft 42 into the sleeve in that the recesses accommodate any imperfections at the corners of the shaft. The corners of the hexagonal outer surface of sleeve 44 are formed with small protrusions 46 complementary to the recesses mentioned above.

Each sleeve 44 is bonded inside a bush 48 which is also of an elastomeric material and which is of elliptical shape in cross-section as can be seen from FIG. 3. The bush 48 is in turn bonded inside an elliptical outer sleeve 50 which is moulded into the elastomeric body 40 of the traction element and is bonded to the material from which the element is made.

Moulded inside the elastomeric body 40 are two cables 52 (only one of which is visible in FIG. 3). Each cable is looped around both of the sleeves 50 in a crossed configuration and the opposed ends of the cable are joined by a sleeve 54. The cables act as tension members inside the traction element.

The elastomeric traction element described above forms the subject of co-pending patent application Ser. No. 594,140 of even date herewith entitled "Traction element for a vehicle track."

Figure 4:
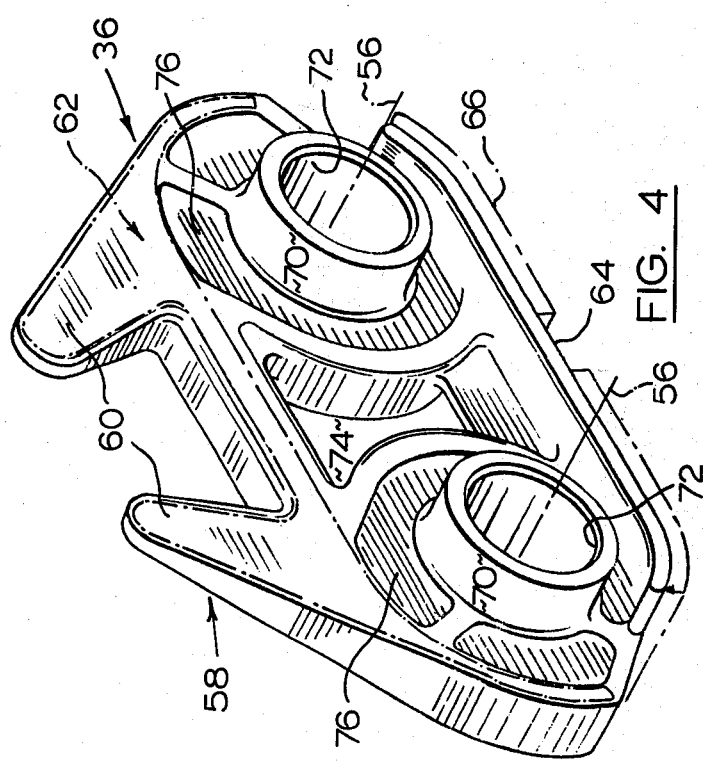
FIG. 4 is a perspective view of one of the track guiding elements of the track of FIG. 2.

FIG. 4 shows one of the guiding elements 36 of the track of FIG. 2. The element is cast and machined in steel and is formed by a body adapted to be coupled with other elements in the track about two transverse pivotal axes spaced longitudinally of the element. The axes are denoted 56 in FIG. 4. The body includes upwardly projecting guide means generally indicated at 58 and including two upwardly projecting lugs 60 which are angled inwardly of the element. The inwardly angled configuration of the lugs 60 is to allow clearance for relative angular movement between longitudinally adjacent guiding elements when the track is in use. The guide means defines laterally disposed guiding surfaces at opposite sides of the element. One of said surfaces is generally indicated at 62 in FIG. 4; the other surface is not visible but is the same as surface 62. The surfaces 62 serve to laterally locate the track in use as will be described.

Figure 5:
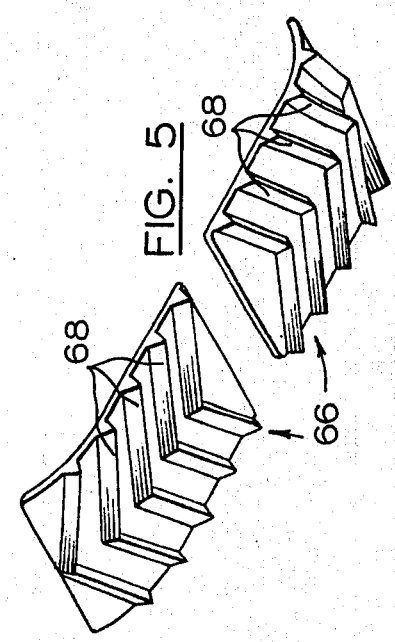
FIG. 5 is a perspective view of a traction cleat intended to be fitted to the guiding element of FIG. 4.

The body of the guiding element also defines a lower ground-engaging surface 64 of the element. As can be seen, the surface 64 is generally flat with upturned ends. FIG. 5 shows two traction cleats 66 which may be fitted to the surface 64 of the guiding elements as indicated in ghost outline in FIG. 4. Each of the cleats 66 is formed on its lower surface with a series of chevron-shaped generally transverse projections 68 which are spaced longitudinally of the cleat. The cleats are fitted to the guiding element to provide extra traction on slippery surfaces, e.g., ice. In this embodiment, the traction cleats are intended to be welded to the guiding element although they could be attached in any convenient fashion (e.g. by bolts, integral casting or the like).

The body of the guiding element 36 also defines cylindrical track driving formations 70 which project to both sides of the body at the positions of the axes 56 and which are disposed concentrically with respect to the axes. As can be seen from FIG. 6 (to be described) two projections 70 are provided at the position of each axis 56. The two rear most projections are not visible in FIG. 4. The two sets of projections define cylindrical openings 72 in the body of the guiding element. The body is also formed with a central opening 74 and with machined recesses 76.

Reference will now be made to FIG. 6 in describing how the elements of the track are assembled. As has previously been mentioned, in the particular track configuration under discussion, three rows of traction elements are provided on each side of a single row of guiding elements (FIG. 2). FIG. 6 is a section taken at the position of one of the coupling shafts 42 of the track. Each shaft 42 extends through the inner hexagonal sleeves 44 of the coupling assemblies 43 of relevant ones of the traction elements.

Each opening 72 of each guiding element is fitted with a coupling assembly 76 (FIG. 6) similar to one of the assemblies 43 but without the outer sleeve. The assemblies 76 each include an inner sleeve 78 similar to sleeve 44 of assembly 43 and an elliptical bush 80 similar to bush 48 of assembly 43. Bush 80 is bonded to sleeve 78 and the assembly is an interference fit in the relevant one of the openings 72. Adhesive is also used to prevent turning of the assembly. It will be noted that the ends of the sleeves 44 and 78 project slightly from the sides of the respective elements and are arranged in abutment with one another so as to space the elements slightly transversely of the track. Each end of each shaft 42 receives a collar which is attached to the shaft by a hollow cylindrical spring pin 79.

It will be appreciated that the shafts 42 described above define the pivot axes P referred to in connection with FIG. 2. The shafts allow the track elements to turn with respect to one another about the axes P as the track curves in following its drive path in use. As the elements move about said axes P, torsional forces are applied to the elastomeric bushes 48 (in the case of the traction elements) and 80 (in the case of the guiding elements). These forces cause distortion of the bushes allowing the elements to pivot. The fact that the bushes are elliptical inhibits turning of the bushes under the effect of said torsional forces.

Figure 7:
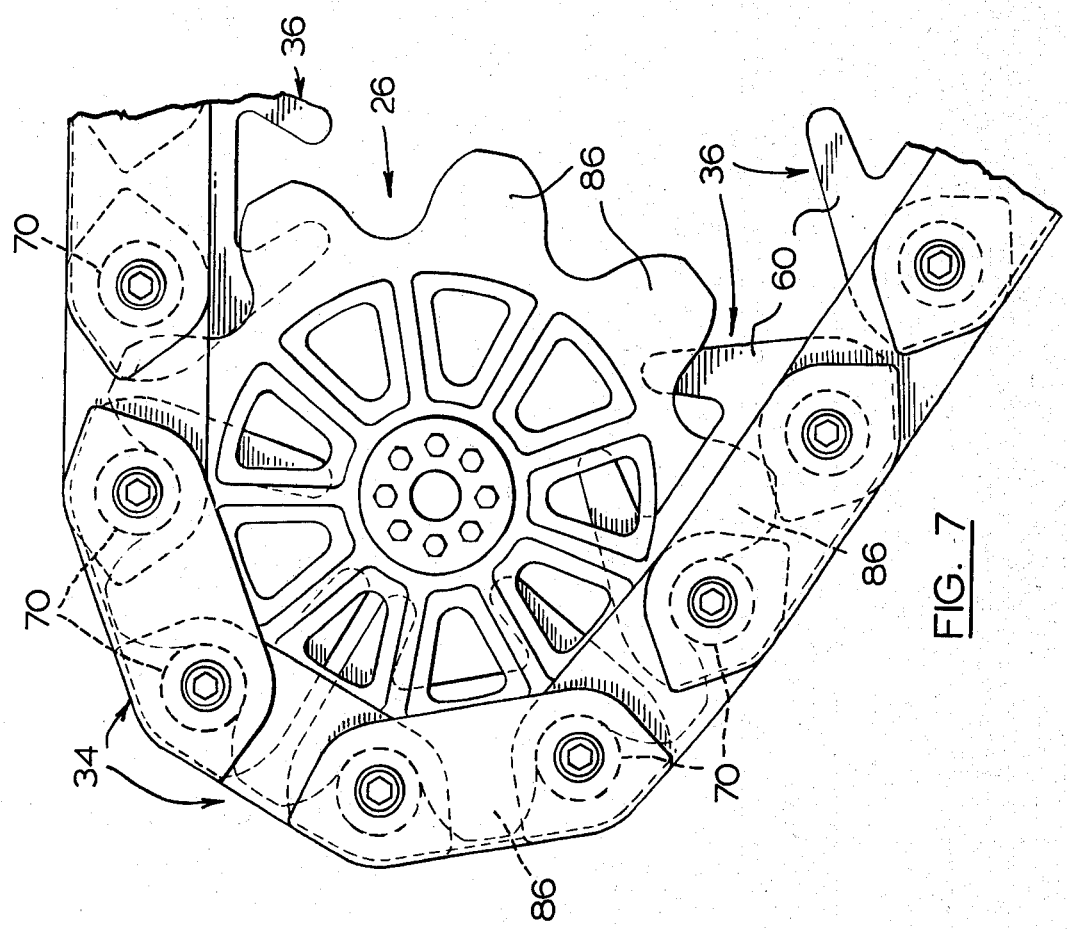
FIG. 7 is a side view of the track at the position of the drive sprocket.

FIG. 6 also shows the drive sprocket 26 for the track and FIG. 7 shows the sprocket in side view. As can be seen, sprocket 26 is in effect a double sprocket wheel made up of two similar sprocket halves 82 coupled together by bolts 84. The respective sprocket halves 82 define similar series of sprocket teeth 86, the general shape of which can be seen from FIG. 7. The teeth of the respective sprocket halves are spaced at a distance slightly greater than the width of the guiding elements 36 so that the lugs 60 of the elements are located between the sprocket halves. As the track is driven in use, the lugs 60 of successive guiding elements pass between the sprocket halves 82 so that the track is laterally located by the lateral guiding surfaces 62 of the guiding elements 36. The idler wheel 28 and support wheels 30 for the track (FIG. 1) are similarly of two part construction to ensure lateral location of the track along its upper run. The road wheels 32 laterally locate the track along its lower run as will be described.

FIG. 7 shows how the lugs 60 of the guiding elements also assist in guiding the track as it approaches the sprocket 26.

The track is driven by engagement of the sprocket teeth with the projections 70 at respectively opposite sides of the guiding elements. As each guiding element 36 reaches the sprocket 26, the projections 70 at respectively opposite sides of the leading end of the element are engaged by the teeth 86 of the sprocket and the element is propelled forwardly by rotation of the sprocket. Subsequent teeth engage the projections 70 adjacent the trailing end of the element and take up the drive.

Figure 8:
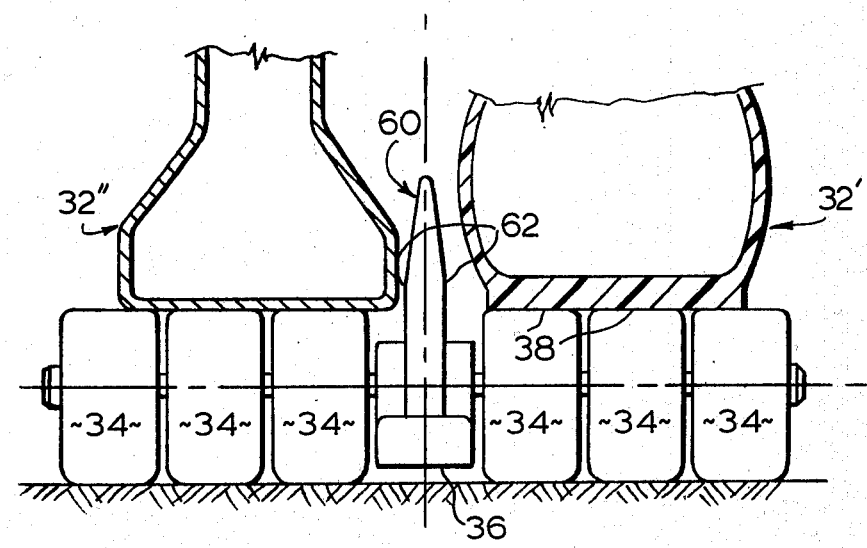
FIG. 8 is a diagrammatic vertical section through the track of FIG. 2 and illustrates two different types of vehicle road wheels which may be used in association with the track.

FIG. 8 is a simplified diagrammatic version of FIG. 6 but without the drive sprocket 26. As can be seen from FIG. 8, the upper surfaces 38 of the traction elements form a contact area for the road wheels of the vehicle to which the track is fitted. The right hand half of the drawing shows a pneumatic road wheel 32' in contact with the track. The other half of the drawing shows a fabricated metal wheel 32''. It will of course be appreciated that FIG. 8 is in effect a composite view showing two alternative road wheels and that in practice both road wheels would be the same. FIG. 8 also shows how, in the dual road wheel arrangement shown, the track is guided by the lateral guiding surfaces 62 of the guiding elements 36. The lugs 60 of the elements are located between the two road wheels and locate the track laterally by contact with the inner surfaces of the respective wheels.

Figure 9:
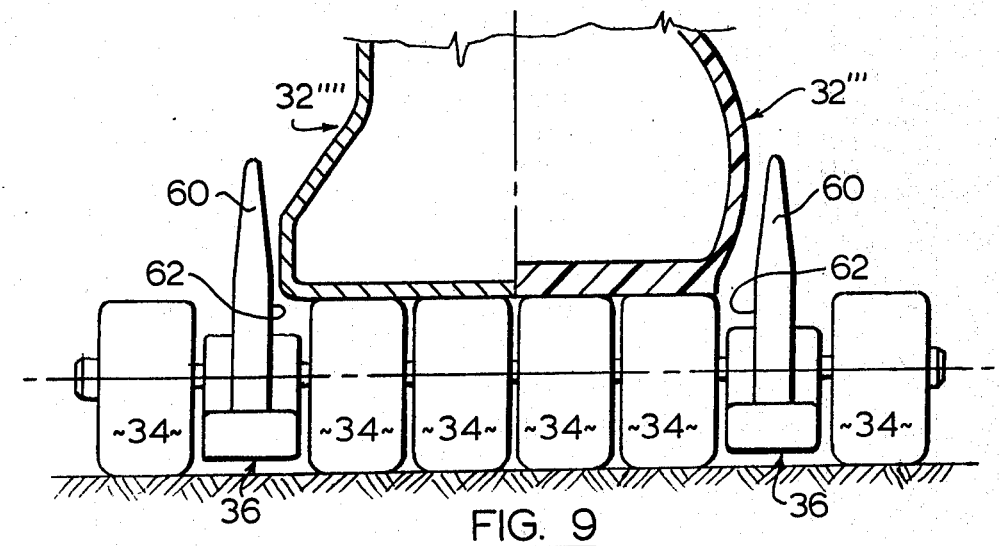
FIG. 9 is a view similar to FIG. 8 and shows how the same types of road wheel may be used in association with a different track configuration; and, FIG. 10 is a side view of the track showing the guiding element in co-operation with a road wheel.

FIG. 9 is another composite view similar to FIG. 8. In this case, the track configuration is designed for a vehicle having single road wheels. This track includes two rows of guiding elements 36 located adjacent respectively opposite outer edges of the track on opposite sides of a single road wheel. As in the FIG. 8 arrangement, the lateral guiding surfaces 62 of the guiding elements locate the track but in this case only one surface of each element is used. Numeral 32''' indicates a penumatic wheel and 32'''' a fabricated wheel.

Figure 10:
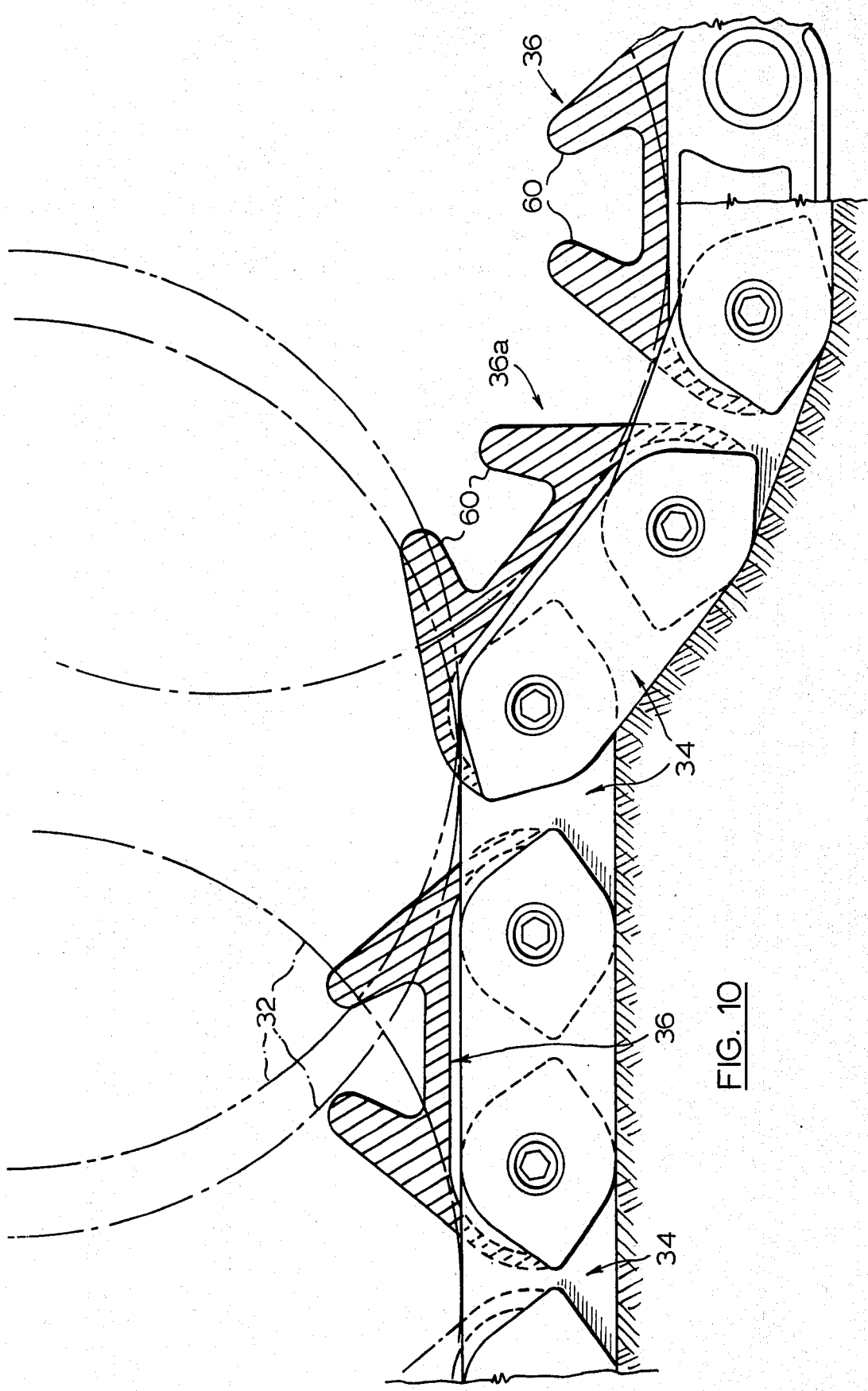

Finally, in FIG. 10, one of the road wheels 32 of the vehicle is shown in chain line at several different positions. The shaded areas on the guiding elements 36 represent the guiding surfaces of the elements. One of the guiding elements (denoted 36a) is shown in a downwardly-angled position and it will be noted that, even in this position, (which is fairly extreme in practice), the lugs 60 of element 36a co-operate with the road wheel to laterally locate the track.

It will of course be understood that the preceding description applies to a specific embodiment of the invention and that many modifications are possible within the broad scope of the invention. For example, in the embodiment described above, each traction element and each guiding element occupies a similar area of the track. However, this is not essential within the broad scope of the invention. The traction elements and guiding elements could be of different sizes, although the distances between the pivot axes of the respective elements must always be the same. The traction elements need not be of the specific type shown.

They may be made of any suitable elastomeric or plastic material and may each be provided with one or more internal cables or other tension members. The deformable bushes in the coupling assemblies of the track elements may similarly be of any suitable elastomeric or plastic material. However, the means coupling the track elements need not be of the type described. Any appropriate coupling arrangement providing transverse pivot axes may be employed. The guiding elements themselves may also be modified. For example, the shaping of the element and the size of its lateral guiding surfaces may vary. The elements may be made of any suitable metal, plastic or elastomeric material. Also, each element may have a single upwardly-projecting guide formation instead of the two lugs (60) described above.

With reference to the arrangement of the track elements, reference may be made to co-pending patent application Ser. No. 594,139 of even date herewith entitled "Improvements in vehicle tracks."

It is to be understood that FIG. 1 of the drawings is merely a schematic illustration of one type of vehicle to which the track could be fitted. As has been explained, the vehicle of FIG. 1 is fitted with two tracks located at respectively opposite sides of the vehicle. In an alternative type of vehicle, additional tracks may be provided. Some or all of these tracks may be mounted on steerable sub-assemblies pivotally coupled to the body of the vehicle in question.

The drive sprocket 26 could be located adjacent the front of the vehicle and the idler wheel 28 adjacent the rear of the vehicle. Of course, the number of road wheels 32 and the number of track supporting idlers 30 may also vary. In fact the idlers may be omitted in some arrangements.

Finally, reference may be made to co-pending patent application Ser. No. 594,138 of even date herewith entitled "Improvements in drive sprockets for vehicle tracks." This application describes an alternative drive sprocket for a track of the form disclosed in the present application.

What I claim is:
1. An endless track for a tracked vehicle, the track comprising:
   a plurality of track elements including:
   a. resilient traction elements adapted for engagement with the ground in use and presenting generally flat upper surfaces, the traction elements being arranged in a plurality of parallel rows which extend longitudinally of the track, and said generally flat upper surfaces of the elements defining portions of the track for contact by road wheels of a vehicle to which the track is fitted in use; and,
   b. guiding elements adapted to locate the track laterally in use, said guiding elements being arranged in at least one row parallel to said rows of traction elements;
   means resiliently coupling together said track elements in an endless configuration, said means defining pivot axes which extend transversely of the track and which are arranged so that each said element is pivotable about two such axes located adjacent respectively opposite ends of the element;
   each said guiding element comprising a body which includes:
      upwardly projecting guide means extending longitudinally of the body and defining laterally-disposed guiding surfaces for lateral location of the track, said guide means having inwardly angled ends to allow clearance for relative angular movement between similar elements located adjacent one another longitudinally of the track;
      a lower ground-contact surface on the said body; and,
      cylindrical track driving formations projecting to both sides of said body at the position of each of said axes and disposed concentrically with respect to said axes.

2. A track as claimed in claim 1, wherein said guide means of each guiding element includes two upwardly projecting lugs which are angled inwardly towards one another and which define said ends of the guide means.

3. A track as claimed in claim 1, wherein the body of each guiding element is formed with two transverse cylindrical openings at the positions of said axes, and wherein said resilient coupling means includes a resilient bush of elliptical shape secured in each of said openings in the element, and an inner sleeve bonded inside each bush and receiving in non-rotatable fashion a shaft coupling the element with other elements in the track.

4. A track as claimed in claim 3, wherein said sleeve is of hexagonal shape in cross-section and receives a hexagonal shaft.

5. A track as claimed in claim 1, further comprising traction cleats fitted to said ground-contact surfaces of each of said guiding elements, each said cleat having a lower surface which defines projections for engagement with the ground.

6. A track as claimed in claim 5, wherein said projections of each traction cleat are of chevron shape and extend generally transversely of the lower surface of the cleat.

7. In an endless track for a tracked vehicle, the track comprising:
a plurality of track elements including:
  a. resilient traction elements adapted for engagement with the ground in use and presenting generally flat upper surfaces, the traction elements being arranged in a plurality of parallel rows which extend longitudinally of the track, and said generally flat upper surfaces of the elements defining portions of the track for contact by road wheels of a vehicle to which the track is fitted in use; and,
  b. guiding elements adapted to locate the track laterally in use, said guiding elements being arranged in at least one row parallel to said rows of traction elements;

means resiliently coupling together said track elements in an endless configuration, said means defining pivot axes which extends transversely of the track and which are arranged so that each said element is pivotable about two such axes located adjacent respectively opposite ends of the element;
the improvement wherein each said guiding element of the track comprises a body which includes:
  upwardly projecting guide means extending longitudinally of the body and defining laterally-disposed guiding surfaces for lateral location of the track, said means having inwardly angled ends to allow clearance for relative angular movement between similar elements located adjacent one another longitudinally of the track;
  a lower ground-contact surface on said body; and,
  cylindrical track driving formations projecting to both sides of said body at the position of each of said axes and disposed concentrically with respect to said axes.

* * * * *